United States Patent
Bear

(10) Patent No.: US 9,674,681 B2
(45) Date of Patent: Jun. 6, 2017

(54) IN-BAND VOICE WITH SECURITY SIGNALING

(71) Applicant: Telular Corporation, Chicago, IL (US)

(72) Inventor: Christopher Bear, Marietta, GA (US)

(73) Assignee: Telular Corporation, Chicago, IL (US)

(*) Notice: Subject to any disclaimer, the term of this patent is extended or adjusted under 35 U.S.C. 154(b) by 0 days.

(21) Appl. No.: 13/733,659

(22) Filed: Jan. 3, 2013

(65) Prior Publication Data
US 2013/0189943 A1    Jul. 25, 2013

Related U.S. Application Data

(60) Provisional application No. 61/582,546, filed on Jan. 3, 2012.

(51) Int. Cl.
  *G08B 25/00* (2006.01)
  *H04W 4/22* (2009.01)

(52) U.S. Cl.
  CPC .................................. *H04W 4/22* (2013.01)

(58) Field of Classification Search
  CPC ...... G08B 27/00; H04N 1/32782; H04Q 1/45; H04Q 2213/13174; H04W 4/22; H04M 7/006; H04M 11/04
  USPC ......................................................... 340/287
  See application file for complete search history.

(56) References Cited

U.S. PATENT DOCUMENTS

| | | | | |
|---|---|---|---|---|
| 5,131,019 A | * | 7/1992 | Sheffer | G08B 25/009 379/39 |
| 5,327,478 A | * | 7/1994 | Lebowitz | H04M 11/04 379/39 |
| 5,454,024 A | * | 9/1995 | Lebowitz | G08B 29/16 379/39 |
| 5,517,547 A | * | 5/1996 | Ladha et al. | 379/40 |
| 5,568,535 A | * | 10/1996 | Sheffer et al. | 379/39 |
| 7,026,926 B1 | * | 4/2006 | Walker, III | G08B 27/00 340/506 |
| 7,194,072 B2 | * | 3/2007 | Gamble | 379/102.03 |
| 7,542,721 B1 | * | 6/2009 | Bonner | G08B 25/004 340/539.1 |
| 7,577,420 B2 | * | 8/2009 | Srinivasan | G08B 25/006 340/287 |
| 7,853,199 B2 | * | 12/2010 | Blum | H04M 7/123 340/509 |
| 7,853,200 B2 | * | 12/2010 | Blum | H04M 7/123 340/506 |
| 7,920,841 B2 | * | 4/2011 | Martin | G08B 25/08 455/404.1 |

(Continued)

*Primary Examiner* — Quang D Pham
(74) *Attorney, Agent, or Firm* — Adam K. Sacharoff; Much Shelist

(57) ABSTRACT

The present invention includes an aspect directed to in-band voice capabilities with security signaling. For sessions that do not involve voice, the signaling data can be sent to the alarm communication center using a data channel, without using a voice channel. In other aspects, the protocol used to transmit alarm events from the alarm device to the alarm communication center resembles industry-standard alarm format, but differs in specific ways that recognize both advantages and disadvantages of the cellular medium. In yet other aspects, the invention may use a timeout in order to ensure orderly resource management in the case of a communication failure.

1 Claim, 3 Drawing Sheets

System Description

(56) References Cited

U.S. PATENT DOCUMENTS

| | | | |
|---|---|---|---|
| 7,920,842 B2 * | 4/2011 | Martin | G08B 25/08 455/404.1 |
| 7,920,843 B2 * | 4/2011 | Martin | G08B 25/08 455/404.1 |
| 8,022,807 B2 * | 9/2011 | Martin | G08B 25/08 340/10.2 |
| 8,140,048 B2 * | 3/2012 | Martin | G08B 25/08 455/401 |
| 8,510,416 B2 * | 8/2013 | Johan | H04L 41/0803 709/219 |
| 2004/0024522 A1 * | 2/2004 | Walker et al. | 701/210 |
| 2004/0247102 A1 * | 12/2004 | Reindle et al. | 379/142.01 |
| 2005/0001717 A1 * | 1/2005 | Bohbot | G08B 13/19645 340/531 |
| 2005/0186937 A1 * | 8/2005 | Graham | H04L 12/66 455/404.1 |
| 2006/0232409 A1 * | 10/2006 | Gray et al. | 340/572.1 |
| 2008/0309449 A1 * | 12/2008 | Martin | G08B 25/08 340/3.1 |
| 2008/0311878 A1 * | 12/2008 | Martin | G08B 25/08 455/404.1 |
| 2008/0311879 A1 * | 12/2008 | Martin | G08B 25/08 455/404.1 |
| 2009/0325559 A1 * | 12/2009 | Blum | H04M 7/123 455/415 |
| 2010/0007488 A1 * | 1/2010 | Sharma | H04M 11/04 340/539.17 |
| 2010/0097210 A1 * | 4/2010 | Tyroler | G01D 21/00 340/540 |
| 2010/0330960 A1 * | 12/2010 | Ravishankar | H04M 3/2281 455/410 |
| 2011/0028116 A1 * | 2/2011 | Blum | G08B 25/009 455/404.1 |
| 2011/0065414 A1 * | 3/2011 | Frenette et al. | 455/404.1 |
| 2011/0169628 A1 * | 7/2011 | Elliot | H04L 12/40013 340/506 |
| 2011/0183643 A1 * | 7/2011 | Martin | G08B 25/08 455/404.1 |
| 2012/0023188 A1 * | 1/2012 | Martin | 709/217 |
| 2012/0157034 A1 * | 6/2012 | Martin | G08B 25/08 455/404.1 |
| 2012/0250834 A1 * | 10/2012 | Smith | H04M 11/04 379/45 |
| 2013/0027197 A1 * | 1/2013 | Foisy | G08B 13/1672 340/506 |
| 2016/0049068 A1 * | 2/2016 | Ben-Porath | G08B 25/016 340/539.13 |
| 2016/0086481 A1 * | 3/2016 | McNutt | G08B 25/12 340/540 |

* cited by examiner

System Description

Flowchart – Alarm Communicator or Panel Receives Event(s)

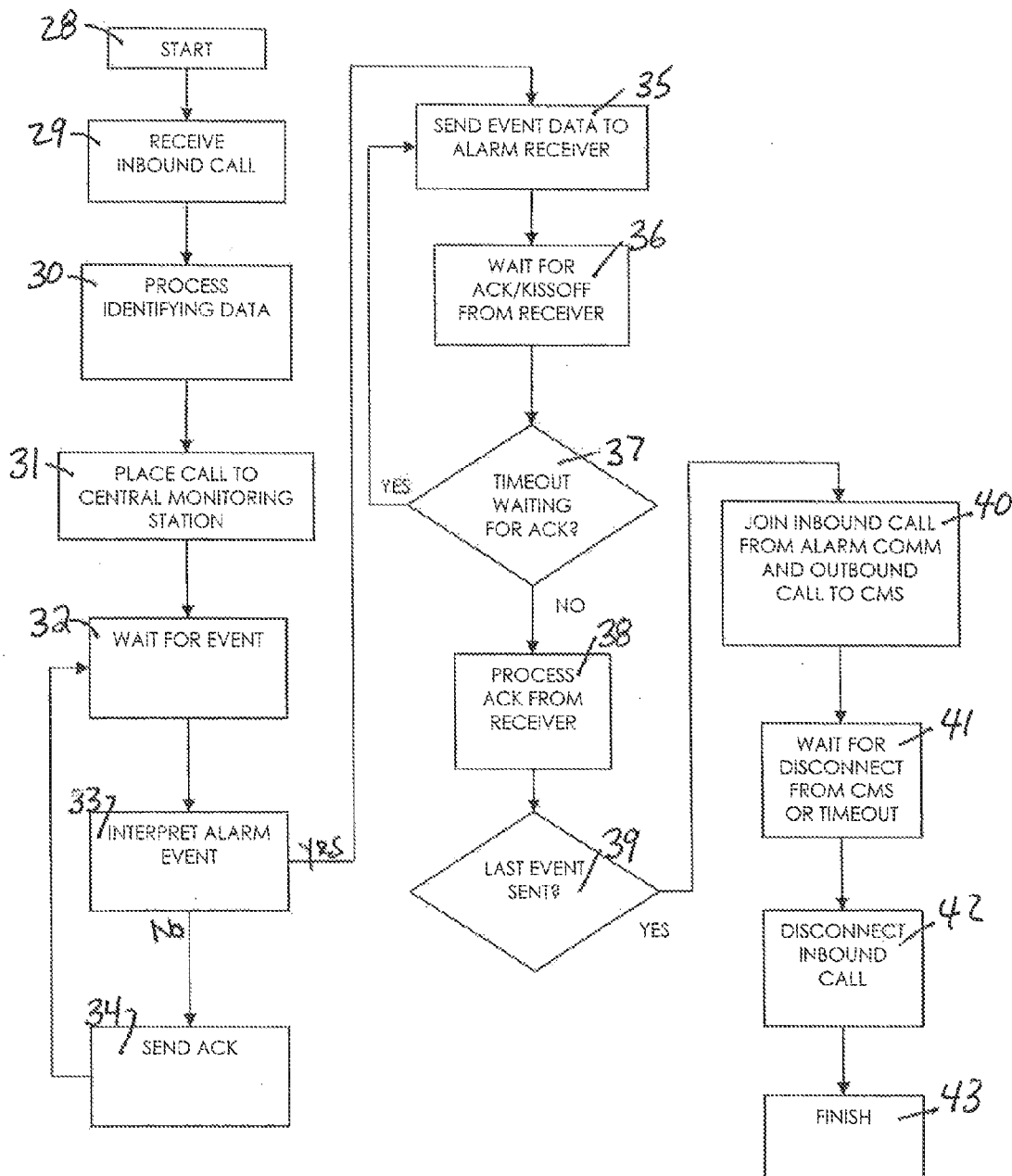

IN-BAND VOICE WITH SECURITY SIGNALING

CROSS REFERENCE TO RELATED APPLICATIONS

The present application is a nonprovisional application of U.S. Application 61/582,546 filed Jan. 3, 2012.

BACKGROUND OF THE INVENTION

Residential and commercial alarm systems typically report events (including alarms) using a phone line connection to the central station. In traditional installations, the event data is sent through a combination of tones and data over the phone line to a DACR (digital alarm communication receiver) located at the central station.

Recently, alarm panels have begun to provide voice communication capabilities, whereby at the end of the event transmission, the alarm panel signals the DACR that it will not disconnect, and the DACR should connect the incoming telephony path to an attendant. At this point, the attendant, via DTMF commands, can establish a one-way or two-way voice path with the alarm panel.

This feature has proven to be very useful for alarm verification, as well as for use in PERS (Personal Emergency Response System) installations. However, it does present difficulties for cellular alarm communications. If the voice channel is used to transmit the security signaling directly to the alarm receiver at the central station, then the signaling may not work well, as telephony facilities at central stations, as well as the alarm receivers themselves, vary widely in quality, and the cellular signal imparts its own, sometimes significant, distortion.

Previous inventions have discussed separating the security signaling and the voice at the alarm premises, sending the security signaling over a dedicated data channel such as SMS or GPRS, and rejoining the signaling and voice at the alarm communication center. This approach, however, can lead to delays, since SMS transit time is multiple (sometimes many) seconds, and GPRS sessions may sometimes be unavailable.

SUMMARY OF THE INVENTION

The current invention uses a single voice channel for both security signaling and voice, with the voice channel connecting the alarm device (either an alarm panel with integrated cellular capability or a cellular alarm communicator) to the alarm communication center. A separate voice channel is used to connect the alarm communication center with the alarm receiver at the central station, and the two separate voice channels are connected together at the appropriate time.

A distinguishing feature of the invention is that the security signaling is not passed through directly from the alarm device to the alarm receiver at the central station. Rather, the alarm device transmits the security signaling data to the alarm communication center via a protocol which uses DTMF to emulate the original alarm format. When an alarm signal is received and understood by the alarm communication center, it is then acknowledged using a DTMF code to the alarm device, and the signal is retransmitted to the alarm receiver at the central station using a standard alarm protocol, e.g. ContactID. By using in-band signaling to pass security signals, the signals avoid the latency associated with SMS data transmission, as well as the risk of an unsuccessful GPRS connection.

It is believed that the approach described in this document is unique in that:

(1) It allows an alarm device to both send event data and provide a voice path to an alarm receiver at the central station.

(2) It uses a specific protocol which uses DTMF to emulate the original alarm format, which allows it to be more resilient over the cellular medium.

(3) Since it uses industry-standard event reporting protocols to send security signals to the alarm receiver, it requires no special equipment at the central station.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 3 is a flow chart of the dialing subsystem as it receives an inbound call.

DESCRIPTION OF THE INVENTION

Figure 1:
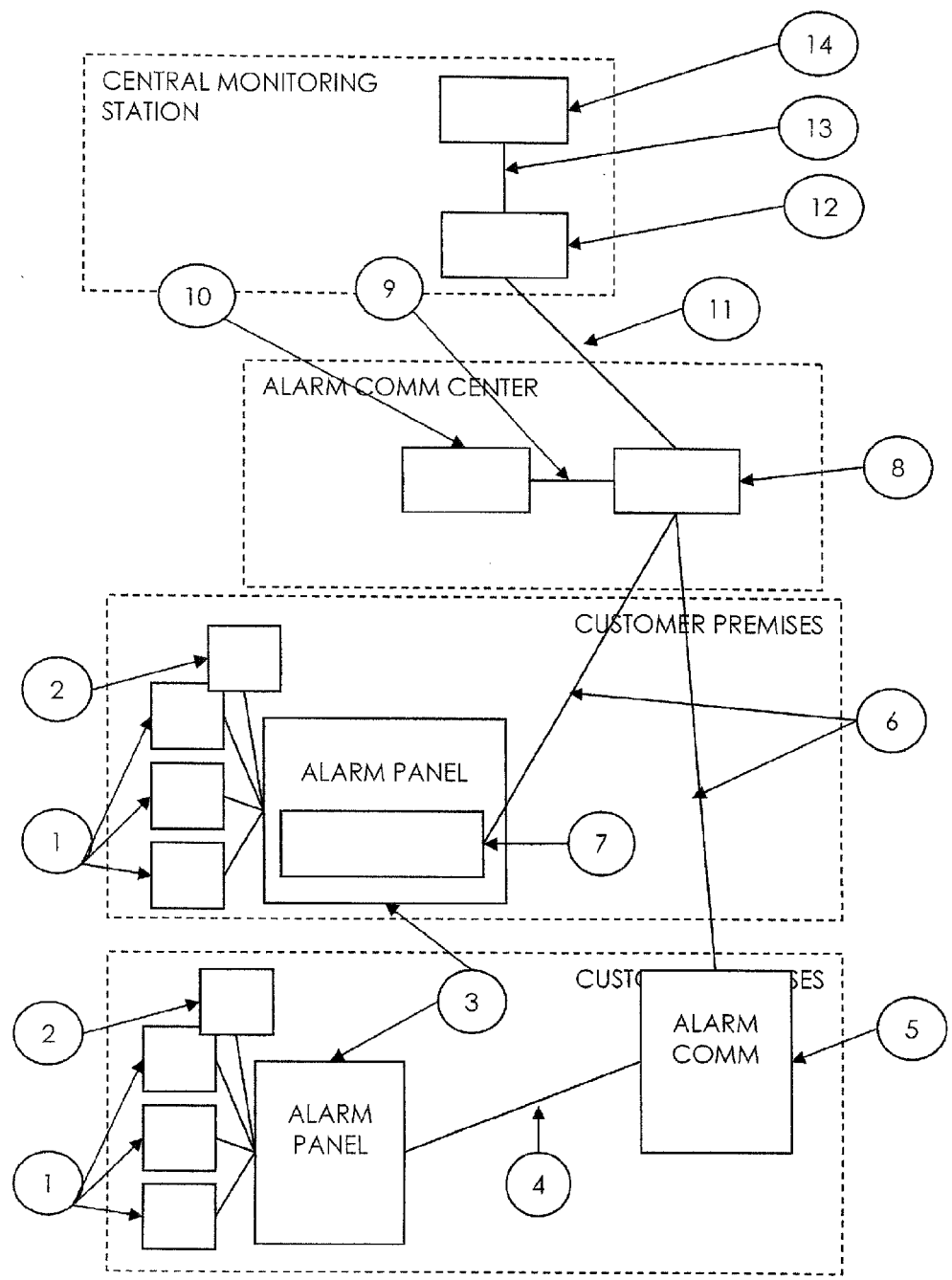
FIG. 1 is a system block diagram of the invention.

While the invention is susceptible to embodiments in many different forms, there are shown in the drawings and will described herein, in detail, the preferred embodiments of the present invention. It should be understood, however, that the present disclosure is to be considered an exemplification of the principles of the invention and is not intended to limit the spirit or scope of the invention and the embodiments illustrated.

Reference is made to FIG. 1, there are provided a number of elements for which their functions are described below:

1. Security sensors—These devices detect intrusion, movement and other events and send notifications to the alarm panel. Sensors may be connected to the alarm panel through either wired or wireless connections.

2. Audio Station—This device provides a speaker and microphone for processing audio. It is used for audio communication with the customer premises, and typically allows both 2-way voice communication and 1-way listen-in capability. The audio station may be stand-alone, or may be integrated into either the alarm panel or an alarm keypad connected to the panel.

3. Alarm Panel—This device collects events from the security sensors, and, depending on the status of the system, sends a notification towards the alarm receiver in the central station. If configured, the alarm panel will provide an audio path from the audio station when an alarm is annunciated.

In one configuration, the alarm panel communicates with a distinct alarm communicator through a POTS telephony interface using standard alarm reporting formats. In another configuration, the alarm panel contains a dedicated, embedded cellular device that allows the alarm panel to communicate with the alarm communication center directly.

4. Alarm Panel/Alarm Communicator Reporting Interface—This is the interface that is used by the alarm panel to report events to the communicator. For alarm panels providing listen-in or 2-way voice capability, this is a dial capture (telephone) connection. It reports events in a particular format, e.g. Contact ID, which contains information about the event, as well as where and when it occurred. If the panel is programmed to deliver an audio channel, then the alarm panel will maintain the audio path on this telephony connection after the alarm signals have been delivered to the alarm communicator.

5. Alarm Communicator—The alarm communicator provides a communication path between the alarm panel and the alarm communication center for reporting events. If it detects that the alarm panel is trying to establish a voice path, it will establish a voice path between the alarm panel and the alarm communication center dialing subsystem.

6. Long-range Voice Interface—This interface connects the alarm communicator to the dialing subsystem of the alarm communication center. It is usually a cellular voice call, although it may also be voice encoded as data over an IP network, i.e. VoIP. In this invention, the long-range voice interface also carries the security signaling, encoded in such a way so as to maximize the resiliency of the signals over the cellular medium.

7. Cellular Communication Module—If a distinct alarm communicator is not used, then the alarm panel contains a dedicated cellular component that allows it to communicate with the alarm communication center.

8. Dialing Subsystem—The Dialing Subsystem receives the event signaling data from the Alarm Communicator or Alarm Panel and acknowledges it back to the alarm communicator or alarm panel. It then sends the alarm signaling to the alarm communication processing subsystem to determine the destination alarm receiver and other specific configuration information. It also translates the event data into the industry standard format to be used to transmit the alarm to the alarm receiver and sends it to the receiver.

9. Alarm Processing/Dialing Subsystems Interface—The Alarm Processing Subsystem uses this interface to instruct the dialing subsystem to make a call to the central station. If the event data received from the alarm communicator contains an indication that this is an audio-enabled event report, then the instructions to the dialing subsystem contain this indication, as well as sufficient data to correlate the dialing instructions with an incoming call arriving at the dialing subsystem from the alarm communicator.

10. Alarm Communication Processing Subsystem—The alarm communication processing subsystem receives events from the dialing subsystem, and the alarm panel to which it is connected. When an event report is received from the alarm communicator, it instructs the dialing subsystem to make a call to the central station, and report the alarm in the appropriate industry standard alarm format.

11. Alarm Communication Center/Alarm Receiver Interface—This interface is a circuit-switched connection that delivers tones and data containing event information, and, in the case of a listen-in event, also provides an audio path between the alarm receiver and the alarm communication center, and, eventually, back to the originating Alarm Panel. The connection is usually made through the Public Switched Telephone Network (PSTN), although it may also be made over private connections. There may also be private telephony equipment, such as a PBX, used at the Central Monitoring Station to route the connection to the Alarm Receiver as appropriate.

12. Alarm Receiver—The alarm receiver collects event reports that originated from the Alarm Panel, which is connected through the alarm communication center. The events are typically processed by central monitoring station software, and are routed to attendants as appropriate. If an audio connection is established with the Alarm Receiver from the Alarm Communication Center Dialing Subsystem, then it establishes a voice path with the attendant. In some cases, the Alarm Receiver may transfer the audio connection to the attendant through telephony equipment, such as a PBX.

13. Alarm Receiver/Attendant Audio Connection—This is the voice path that is established between the Alarm Receiver and the Attendant. This is usually in the form of a telephone call through a private telephony network. In some cases, the Alarm Receiver will invoke a transfer at the PBX of the incoming call, in which case the Alarm Receiver is no longer in the audio path.

14. Attendant Station—The attendant station receives the voice call that originally terminated in the Central Monitoring Station at the Alarm Receiver. As the audio path is then established end-to-end with the Alarm Panel, the attendant is usually able to directly control the microphone and speaker functions at the Alarm Panel, typically through a series of DTMF tone commands.

As shown in FIG. 1, the customer premises may have an alarm panel with the alarm communicator either separated from the alarm panel and in communication therewith or imbedded into the alarm panel; either option is within the scope of this invention.

Figure 2:
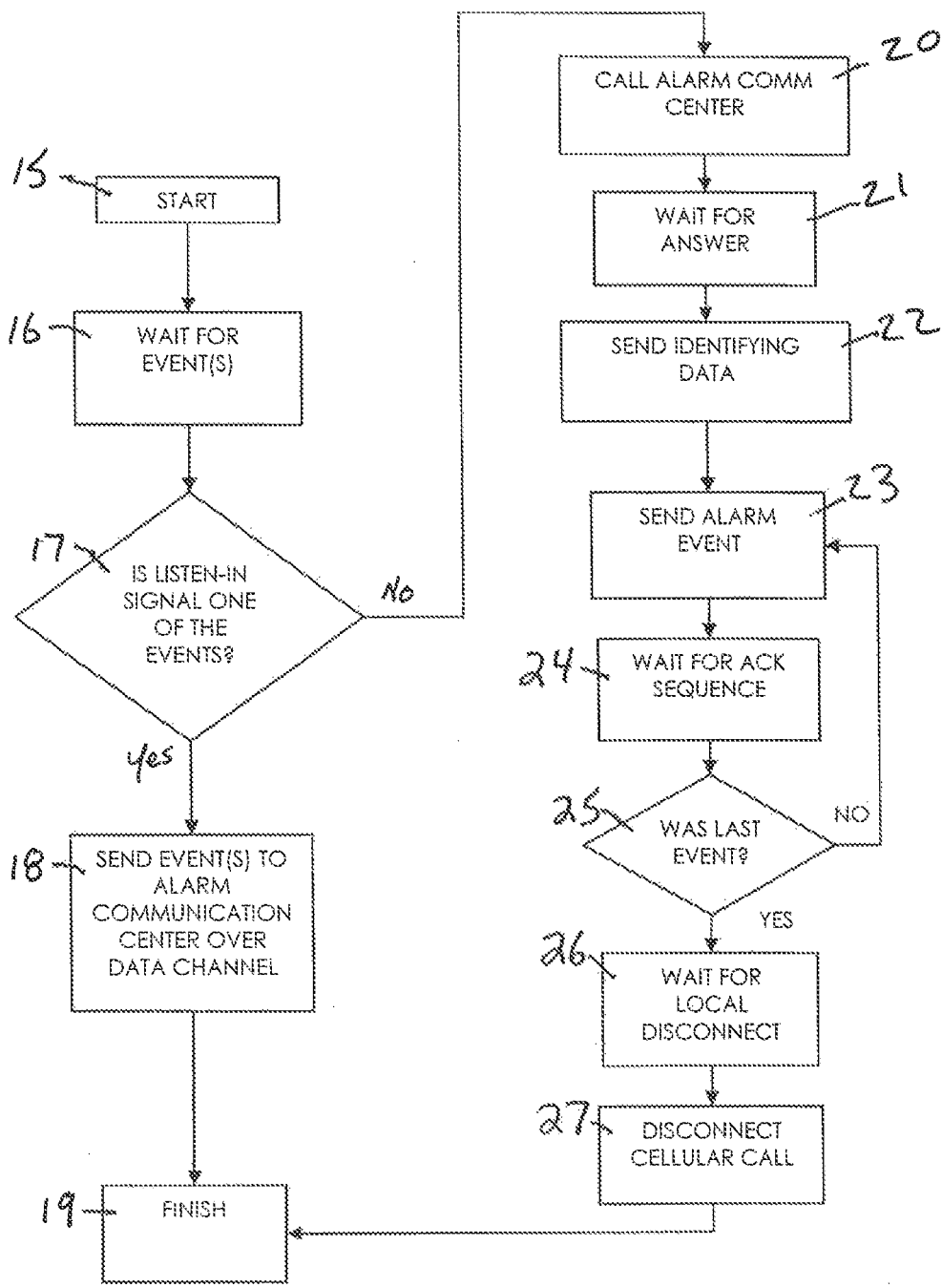
FIG. 2 is a flow chart of the alarm communicator or panel as it receives events.

FIG. 2 is a flowchart of the alarm panel 3 or alarm communicator 5 as it receives events. When the security sensors 1 at a customer's premises detects intrusion, movement, or other alarm or notification events, there is commenced an alarm system process 15 whereby the alarm or notification is sent to an alarm panel 3. As the alarm panel 3 collects the event or events 16, it determines whether the signal is alarm signal only in nature or whether it allows for voice communication. The determination as to whether to use a data or voice channel can either be made via configuration for the particular alarm device, or on a case-by-case basis by examining the event data to be sent.

In the case of a data channel, the listen in signal is directed to the alarm communications center 18 over the data channel where it is received 19. For such events which do not involve voice wherein the signal contains event data only, the signaling data can be sent to the alarm communication center 18 using a data channel, such as SMS or GPRS, without using a voice channel.

In the case of the latter signal allowing for a two-way voice path, a voice call 6 is initiated from the alarm panel or alarm communicator to the alarm communications center 20 where it awaits answering protocol 21 and then identifies its alarm or notification data 22 to complete answering protocol and thereby send its alarm or notification event 23 which is either acknowledged by acknowledgement protocol sequence 24 or cycled for resending 23.

As noted in association with FIG. 1, the alarm panel, if so configured, will provide an audio path from the audio station when an alarm is annunciated. In one configuration, the alarm panel communicates with a distinct alarm communicator through a POTS telephony interface using standard alarm reporting formats. The alarm panel will maintain the audio path on the telephony connection after the alarm signals have been delivered to the alarm communicator. In another configuration, the alarm panel contains a dedicated, embedded cellular device that allows the alarm panel to communicate with the alarm communication center directly. If the alarm communication center detects that the alarm panel is trying to establish a voice path, it will establish a voice path, such as the long range voice interface 6 voice call or voice encoded VoiP data, between the alarm panel and the alarm communication center dialing subsystem.

In either configuration a single voice channel may be used for both security signaling and voice, with the voice channel connecting the alarm device (either an alarm panel with integrated cellular capability or a cellular alarm communicator) to the alarm communication center. A separate voice channel is used to connect the alarm communication center with the alarm receiver at the central station, and the two separate voice channels are subsequently connected together at the appropriate time.

FIG. 3 is a flow chart of the alarm communication center dialing subsystem 8 as it receives an inbound call 29 from the foregoing two configurations of either alarm communicator 5 or the alarm panel 3 with cellular communication module 7.

The dialing subsystem 8 receives the event signaling data from the alarm communicator 5 or alarm panel 3 and acknowledges it back to the alarm communicator or alarm panel. Once the incoming event signaling call is initiated 27 and received 29 by the alarm communication center dialing subsystem 8, processing protocol identifies the incoming event data 30 and sends the alarm signaling to the alarm communication processing subsystem 10 via the alarm processing dialing subsystem interface 9 to determine the destination alarm receiver and other specific configuration information. It also translates the event data into the industry standard format to be used to transmit the alarm to the alarm receiver and sends it to the receiver. When the alarm communication processing subsystem 10 receives events from the dialing subsystem 8, it instructs the dialing subsystem to make a call to the central monitoring station, and reports the alarm in the appropriate industry standard alarm format. In this regard the dialing subsystem 8 places a call to the central monitoring station 14 alarm receiver 12 via the alarm communication center/alarm receiver interface 11.

As noted in association with FIG. 1, the event data received from the alarm communicator contains an indication that this is an audio-enabled event report, then the instructions to the dialing subsystem 8 contain this indication, as well as sufficient data to correlate the dialing instructions with an incoming call arriving at the dialing subsystem from the alarm communicator. In the case of a listen-in event, the interface also provides an audio path between the alarm receiver and the alarm communication center, and, eventually, back to the originating alarm panel.

Upon receipt of the event call 32, the same is interpreted 33 and is acknowledged 34 pending any further event data.

If an alarm event is detected, the event data is sent to the dialing subsystem 8 which collects event reports for an emulation processing protocol 36 thereon that either acknowledges data reception (as, for example, in the case of a Contact ID alarm format with handshake tone) or signals a kiss-off to the alarm panel or alarm communicator by emulation using DTMF signaling. Upon any timeout expiration the event sending can be recycled for re-processing through the protocol. The dialing subsystem 8 then transmits the alarm to the alarm receiver 12 using an industry standard protocol. Once received, the alarm receiver processes acknowledgement of each reported event 38, and once the last event is acknowledged 39, the events are typically processed by central monitoring station (CMS) software, and are routed to attendants as appropriate through telephony equipment. Once the audio path is then established end-to-end with the Alarm Panel, the attendant may directly control the microphone and speaker functions at the Alarm Panel, typically through a series of DTMF tone commands. A disconnect from the central monitoring station or a prescribed time out 41 can precede the disconnecting of the inbound call 42 bringing the dialing subsystem inbound call receipt to a finish 43.

Specific Unique Elements

Selectable Use of Voice Channel—For sessions that do not involve voice, i.e. contain event data only, the signaling data can be sent to the alarm communication center using a data channel, such as SMS or GPRS, without using a voice channel. The determination as to whether to use a voice channel can either be made via configuration for the particular alarm device, or on a case-by-case basis by examining the event data to be sent.

Use of identifying data—In order to correlate event data received over a data path with the associated subscriber data, including the phone number of the alarm receiver, the Dialing Subsystem uses one or more of several mechanisms:

1. The caller ID of the inbound call, if available, is matched against the PSTN phone number or mobile number of the alarm device; and/or 2. In the case of a VoIP-encoded audio stream, data tags associated with the VoIP call setup will be used to correlate the incoming call and the event data at the Dialing Subsystem.

Use of an Emulation Protocol—The protocol used to transmit alarm events from the alarm device to the alarm communication center closely resembles an industry-standard alarm format, but differs in specific ways that recognize both the advantages and disadvantages of the cellular medium. For instance, the Contact ID alarm format includes a handshake tone to indicate to the alarm panel that the alarm receiver has answered. Since the cellular signaling protocol includes answer supervision, this handshake tone is not necessary. Conversely, the reliable reception of the "kissoff" tone is problematic over a cellular call, so an emulation of this must be implemented using DTMF signaling. In one version of this invention, an additional acknowledgement of the kissoff emulation is provided by the alarm device to the alarm communication center, since the transmission of DTMF is more reliable in that direction than in the direction towards the alarm device.

Use of a timeout—In order to ensure orderly resource management in the case of a communication failure, several timers are used to ensure that incoming calls to the Dialing Subsystem are not held indefinitely waiting for correlating event reports, and that events reports to the central monitoring station are not delayed substantially waiting for correlating inbound calls.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims

I claim:

1. A method for handling in-band voice capabilities with security signaling data using a single end-to-end audio path, the method comprising:

receiving, at an alarm communication center, a primary security signaling data from an alarm communicator in contact with an alarm panel over cellular medium, the alarm panel collecting an alarm event detected by security sensors in communication with the alarm panel and an audio enabled event detected by an audio station in communication with alarm panel, wherein the security sensors comprises at least one of intrusion and movement sensor and the audio station comprises a speaker and a microphone for voice communication; wherein the primary security signaling data is generated in response to the alarm event and transmitted from the alarm panel via a DTMF protocol to emulate an original alarm format, wherein when the alarm communicator detects the primary security signaling data including the alarm event and the audio-enabled event, the alarm communicator automatically establishing a first voice channel between the alarm communicator and the alarm communication center such that the primary security signaling data is received at the alarm communication center through the first voice channel; and wherein the primary security signaling data comprising a contact ID which contains information about the alarm event and when and where the alarm event occurred;

acknowledging, by the alarm communication center, a receipt of the primary security signaling data by transmitting a DTMF code back to the alarm communicator;

transmitting, by a dialing subsystem of the alarm communication center, a secondary security signaling data to an alarm receiver at a central station in response to receiving and understanding the primary security signal data by the alarm communication center, and wherein the secondary security signaling data is the primary security signaling data that is retransmitted by the alarm communication center using a standard alarm protocol such that the secondary security signaling data is a different security format than the primary security signaling data, and when the alarm communication center determines the primary security signaling data including the alarm event and the audio-enabled event, the alarm communicator center automatically establishing a second voice channel different than and subsequently created from the first voice channel such that the transmitting of the secondary security signaling data from the alarm communication center to the alarm receiver at the central station is through the second voice channel;

receiving, by the alarm receiver at the central station, the secondary security signaling data; wherein the alarm receiver processes an acknowledgement of a receipt of the secondary security signal data to the dialing subsystem and wherein upon a timeout expiration of waiting for the acknowledgement of the receipt of the secondary security data, the dialing subsystem is configured to recycle the secondary security signaling data to the alarm receiver; and establishing, by the alarm communication center, in response to the acknowledgement of the receipt of the secondary security signal data, the single end-to-end audio path between the alarm panel and the alarm receiver at the central station by connecting together the first voice channel and the second voice channel such that disconnecting the end-to-end audio path from the alarm receiver at the central station automatically disconnects the first voice channel from the alarm communicator, wherein the alarm panel is integrated with cellular capability or a cellular alarm communicator, and wherein the audio path is used to control audio or speaker functions of the audio station connected to the alarm panel.

* * * * *